United States Patent [19]

Roberts, Jr.

[11] 3,723,544
[45] Mar. 27, 1973

[54] PROCESS FOR CLEAVING DICHLOROISOPROPYL ETHER

[75] Inventor: Reginald F. Roberts, Jr., Baton Rouge, La.

[73] Assignee: The Dow Chemical Company, Midland, Mich.

[22] Filed: Oct. 22, 1971

[21] Appl. No.: 191,631

[52] U.S. Cl. ............................... 260/633, 260/652 R
[51] Int. Cl. .............................................. C07c 31/34
[58] Field of Search ........................... 260/633, 652 R

[56] References Cited

OTHER PUBLICATIONS

Fried et al., J. Am. Chem. Soc., 63, 2691, 1941
Starr et al., J. Am. Chem. Soc., 56, 1595–1596, 1934
Burwell, Chem. Reviews 54, 622–630, 654–656, 1954

*Primary Examiner*—Howard T. Mars
*Attorney*—William M. Yates et al.

[57] ABSTRACT

Process for the acidolysis or ether cleavage of dichloroisopropyl ether to convert it into propylene dichloride and propylene chlorohydrin by the steps of adding a catalytic amount of zinc chloride, aluminum chloride or ferric chloride to the dichloroisopropyl ether, heating the mixture in an atmosphere of hydrogen chloride gas, and recovering the products. The process is useful to convert waste streams containing dichloroisopropyl ether into valuable products.

3 Claims, No Drawings

PROCESS FOR CLEAVING DICHLOROISOPROPYL ETHER

BACKGROUND OF THE INVENTION

This invention relates to a process for the conversion of a waste stream containing dichloroisopropyl ether (DCIPE) into valuable products. More particularly, the invention concerns the acidolysis or ether-cleavage of a waste feedstock containing DCIPE into propylene chlorohydrin (PCH) and 1,2-dichloropropane (PDC).

Dichloroisopropyl ether or bis(chloroisopropyl)ether is a by-product in the commercial production of propylene glycol by the liquid-phase reaction of chlorine, water and propylene. See, for example, "Encyclopedia of Chemical Technology," Second Edition, Vol. 16, pages 600–609 (1968). Because DCIPE is a long-lasting pollutant and has to be disposed of by incineration or by burial in the ground, it became increasingly important that an economic means be found to dispose of or convert the vast amounts of this by-product which are created.

It is known from the article by Fried et al., *J. Am. Chem. Soc.*, 63,2691 (1944) that tetrahydrofuran can be cleaved to tetramethylene chloride using gaseous hydrogen chloride and large amounts i.e., 50 percent by weight) of zinc chloride. In the present invention only catalytic amounts (less than 2 percent by weight) of zinc chloride are used to effect cleavage.

SUMMARY OF THE INVENTION

It now has been discovered that waste streams containing DCIPE from the production of propylene glycol by the reaction of chlorine, water, and propylene, can be treated with a catalytic amount of zinc chloride, aluminum chloride or ferric chloride under an atmosphere of hydrogen chloride to produce PCH and PDC.

In accordance with this invention there is provided a process for the recovery of useful chlorinated products from the acidolysis of a waste-stream feedstock containing a major proportion of DCIPE and a minor proportion of PDC with or without a small amount of PCH. The steps of the process generally comprise the steps of: (a) adding a catalytic amount of zinc chloride, aluminum chloride or ferric chloride to the feedstock; (b) heating this mixture in a reaction zone under an atmosphere of hydrogen-chloride gas to a temperature in the range from about 150° to about 240° C under a pressure of from about zero to about 225 pounds per square inch gage (psig); and (c) recovering chlorinated products. Since the products of the process comprise mainly PDC and PCH, these are distilled off from the other products to recover them in a high yield.

DETAILED DESCRIPTION

The process of this invention solves the problem of disposing of waste streams containing DCIPE by continuously converting this ether to PCH and PDC and recovering these as separate distillates. If desired, the process can be operated as a batch process; but it is preferably operated as a continuous process.

In the first step of this process, a catalytic amount of zinc chloride, aluminum chloride or ferric chloride is added to a waste stream containing DCIPE and PDC. It is preferred to add these Lewis acids as a slurry or solution in acetone, DCIPE, or other inert organic liquids. Generally, the waste stream will vary from about 60 percent to about 90 percent by weight of DCIPE, with the remainder being PDC and about 0–5 percent PCH.

For the purposes of this invention, a catalytic amount of the above Lewis acids is defined as about 0.01 to about 1.0 weight percent based on the feed. The preferred amount is from 0.05 to 0.2 percent.

This mixture is then pumped into a corrosion-resistant, pressured reactor such as stainless steel, a nickel-jacketed reactor, Monel, or the like wherein the contents are heated (e.g., steam coils or the like) to a temperature in the range from about 150° to about 240°C. Preferably the temperature range is from about 160° to about 220°C.

The heating step is carried out in an atmosphere of hydrogen-chloride gas under a pressure of 0–225 psig, but preferably in the range from 10–50 psig.

It is desirable to provide a continuous purge or flow rate of hydrogen chloride. Generally this flow rate will be from about 0.1 to about 1.0 pounds and preferably from about 0.21 to about 0.5 pounds of HCl per pound of feedstock.

The vaporized products of the reaction are continuously removed overhead and fractionally distilled to recover the desired PDC and PCH from the propionaldehyde and chloropropenes which are also formed. The non-volatile reaction products such as 1,2,3-trichloropropane, polymers, and the Lewis acid used are removed periodically from the bottom of the reactor for incineration or other disposal means. If desired, the unreacted DCIPE can be continuously recycled to the reactor for further conversion into useful products.

The invention is further illustrated by the following examples.

EXAMPLE 1

Into a Monel reactor of approximately 190 ml capacity was charged:

104.0 grams (0.608 mole) of reagent grade (97 percent) dichloroisopropyl ether (DCIPE)

0.20 gm (0.0015 mole, 0.2 pph) of anhydrous $ZnCl_2$.

The reactor was sealed by closing a valve. Stirring was begun by actuating an electrically-driven shaft connected to a propellor-type agitator. The steam-jacketed reactor and contents were heated to approximately 165°C with 50–100 psig steam, and reaction was initiated by pressuring in anhydrous HCl (from a cylindrical metal bomb through a pressure regulator) to a total pressure of about 150 psig. The reaction was continued at essentially constant temperature and pressure (with HCl supplied as needed to maintain pressure) for a period of 6 hours. At the end of this time, the reaction was stopped by closing the HCl inlet valve, shutting off the steam, and sending cooling water through the reactor jacket. When the reaction mixture had cooled to approximately 30°–40°C, the reactor was vented down to atmospheric pressure and the product recovered by opening a valve. The product mixture was found to contain 5 percent propylene dichloride (PDC), 4 percent propylene chlorohydrin (PCH), and 91 percent unreacted ether (DCIPE) by weight. The total weight of the recovered product mixture was 105.9 grams, and the total weight of ether and zinc chloride charged was 104.2 grams. The calculated amount of HCl reacted was 1.7 grams. Recovery was, therefore, essentially quantitative. The amount of ether which reacted was 0.045 moles or 4.4 percent; of the ether which reacted, 0.047 moles or 52 percent was converted to 1,2-dichloropropane (PDC), and 0.044 moles or 48 percent to propylene chlorohydrin (PCH).

EXAMPLE 2

Dichloroisopropyl ether (DCIPE) containing 16 percent PDC and 0 percent PCH was reacted with anhydrous hydrogen chloride in a 1 liter stainless steel reactor. The catalyst used was $ZnCl_2$ at a concentration of 0.002 g. $ZnCl_2$/g. DCIPE. The reactor was heated with electric-strip heaters to the reaction temperature of 200°C which was controlled by a temperature controller. The HCl was fed from a cylinder at the rate of 0.72 g. HCl/min., which was flow-controlled with a control valve. The reactor pressure (measured by a pressure transmitter) was controlled at 50 psig with a control valve in the vapor-take-off line. The reactor was initially charged with 500 g. of DCIPE, which comprised half the reactor volume. The liquid level in the reactor was measured by a differential-pressure cell, and maintained at 50 percent of the reactor volume. As the level dropped off, the ether-feed-control valve opened, allowing more DCIPE to be fed from a cylinder mounted on a scale. The cylinder weight was recorded periodically to obtain an ether feed rate. The vaporized products were taken off, condensed, and collected in two sample scrubbers. These were packed, one with ice and one with dry ice. The HCl was scrubbed with water. The product rate was obtained by weighting the amount of product collected in the sample scrubbers. The HCl in the scrubber was measured by titration. At these reaction conditions, an ether-feed rate of 1.0 gm/min. was used and a product rate of 1.24 gm/min. was obtained. A gas chromatograph was used to analyze the ether feed and the product samples. Calculations were based on line-out or steady-state conditions. For these reaction conditions a conversion of 88.3 percent was obtained. The yield to PDC was 44.8 percent and the yield to PCH was 35.9 percent, giving a total yield to the desired products (PDC and PCH) of 80.7 percent. The volume-conversion-rate was 0.687 lb/hr. gal. The byproducts formed were of two types: "lights" (acetone, propionaldehyde, chloropropenes), and "heavies," non-volatile matter (NVM) such as polymeric residues, and 1,2,3-trichloropropane.

Similarly good conversions were obtained with other DCIPE waste streams containing varing amounts of PDC and PCH.

The process has also been operated with an aluminum-chloride or ferric-chloride catalyst, with somewhat less yield and conversion. Other Lewis-acid catalysts such as zinc bromide have been tried; but they are economically less attractive, in that the increased cost does not result in commensurately increased yields.

I claim:

1. A process for the recovery of chlorinated products from the acid-cleavage of a waste feedstock containing a major proportion of dichloroisopropyl ether and a minor proportion of propylene dichloride, which comprises the steps of:
    A. adding a catalytic amount of zinc chloride, aluminum chloride or ferric chloride to the feedstock to form a mixture therewith;
    B. heating said mixture in a reaction zone under an atmosphere of hydrogen-chloride gas to a temperature in the range from about 150° to about 240°C under a pressure from about zero to about 225 psig; and
    C. recovering chlorinated products therefrom.

2. A process as set forth in claim 1, wherein propylene dichloride and propylene chlorohydrin are separately recovered by distillation.

3. A process as set forth in claim 1 wherein zinc chloride is used as catalyst.

* * * * *